(12) United States Patent
Janssen

(10) Patent No.: US 12,164,129 B2
(45) Date of Patent: Dec. 10, 2024

(54) COMBINED FREQUENCY AND MODE FILTER

(71) Applicant: Lumentum Technology UK Limited, Towcester (GB)

(72) Inventor: Adrian Perrin Janssen, Exeter (GB)

(73) Assignee: Lumentum Technology UK Limited, Northamptonshire (GB)

( * ) Notice: Subject to any disclaimer, the term of this patent is extended or adjusted under 35 U.S.C. 154(b) by 1291 days.

(21) Appl. No.: 16/604,921

(22) PCT Filed: Sep. 27, 2018

(86) PCT No.: PCT/GB2018/052759
§ 371 (c)(1),
(2) Date: Oct. 11, 2019

(87) PCT Pub. No.: WO2019/064007
PCT Pub. Date: Apr. 4, 2019

(65) Prior Publication Data
US 2022/0404534 A1 Dec. 22, 2022

(30) Foreign Application Priority Data
Sep. 29, 2017 (GB) ..................... 1715883

(51) Int. Cl.
*G02B 5/28* (2006.01)
*G02B 6/293* (2006.01)

(52) U.S. Cl.
CPC ......... *G02B 5/284* (2013.01); *G02B 6/29359* (2013.01)

(58) Field of Classification Search
CPC . G02B 5/284; G02B 6/29359; G02B 6/29358
(Continued)

(56) References Cited

U.S. PATENT DOCUMENTS

| 5,418,641 A | 5/1995 | Hendow et al. |
| 6,377,386 B1 | 4/2002 | Korn |

(Continued)

OTHER PUBLICATIONS

Belanger et al., "Super-Gaussian output from a CO2 laser by using a graded-phase mirror resonator," Optics Letters, vol. 17, No. 10, May 15, 1992, pp. 739-741.

(Continued)

*Primary Examiner* — Stephone B Allen
*Assistant Examiner* — Jyotsna V Dabbi
(74) *Attorney, Agent, or Firm* — Harrity & Harrity, LLP

(57) ABSTRACT

An optical filter comprising a first lens, and first and second optical elements. The first lens has an optical axis, configured to focus beams propagating parallel to the optical axis at a focal point. The first optical element has a first semi-reflective surface, the first semi-reflective surface being curved and having a first radius of curvature around a first centre of curvature on the optical axis. The second optical element has a second semi-reflective surface. The first radius of curvature is between 1 and 10,000 times the distance between the first semi reflective surface and the focal point along the optical axis. The first and second semi-reflective surfaces are arranged to form a resonator. The first lens and the first and second semi-reflective surfaces are arranged along the optical axis such that light is transmittable along an optical path through the lens and the resonator. The optical filter further comprises one or more expansion elements located outside of the optical path, and arranged such that expansion of the expansion elements causes relative movement of the first and second semi-reflective surfaces.

20 Claims, 4 Drawing Sheets

(58) Field of Classification Search
USPC .......................................................... 359/578
See application file for complete search history.

(56) References Cited

U.S. PATENT DOCUMENTS

2002/0191269 A1* 12/2002 Korn .................. G02B 6/29359
                                                        359/260
2006/0215713 A1   9/2006 Flanders et al.
2010/0245974 A1   9/2010 Pan
2014/0362442 A1* 12/2014 Chen .................. G02B 6/29358
                                                        359/578

OTHER PUBLICATIONS

PCT International Search Report and Written Opinion corresponding to PCT/GB2018/052759, mailed Dec. 19, 2018, 10 pages.

* cited by examiner

COMBINED FREQUENCY AND MODE FILTER

CROSS-REFERENCE TO RELATED APPLICATIONS

This application is a 371 national stage application of PCT Application No. PCT/GB2018/052759, filed on Sep. 27, 2018, which claims priority to United Kingdom Patent Application No. 1715883.3, filed on Sep. 29, 2017, which are incorporated by reference herein.

FIELD OF THE INVENTION

The present invention relates to the field of optical instruments. In particular, the invention relates to an optical filter and systems comprising the filter.

BACKGROUND

An optical system, e.g. for fibre-optic communication, is shown in FIG. 1. The system comprises a laser 101, a modulator 102, a filter 103, a beam splitter 104, a detector 105, and an output 106. The laser 101 produces light, which is then modulated by the modulator 102 (e.g. a Mach-Zehnder modulator) to produce the desired signal. The filter 103 (e.g. an etalon) is used to select the correct wavelength of light and eliminate any noise from the output of the modulator 102. The beam splitter 104 directs a part of the beam to the detector 105, which measures beam characteristics and provides feedback to the filter, laser and modulator controls. The other output of the beam splitter 104 is the output of the system, typically a fibre-optic cable. However, the beam characteristics measured at the detector will not be the same as those transmitted via the output.

After the filter 103, the beam consists of several spatial modes—the intended "Gaussian" zero-order mode ([0,0]) and higher order Hermite-Gaussian modes ([n,m]). For transmission of the signal, these modes are not problematic, as they are relatively quickly attenuated within the output optical fibre. However, they will be detected by the detector 105, resulting in the phase characteristics of the beam at the detector being different to the phase characteristics of the beam after it has travelled along the fibre optic cable (i.e. as received by onward components).

Solutions exist in which the optical signal is directed through a length of fibre before reaching the detector (e.g. using a fibre tap after the output 106 in place of the beam splitter 104). However, the length of fibre required to attenuate the higher-order modes significantly increases the size of the system.

SUMMARY

According to a first aspect of the invention, there is provided an optical filter. The optical filter comprises a first lens, and first and second optical elements. The first lens has an optical axis, configured to focus beams propagating parallel to the optical axis at a focal point. The first optical element has a first semi-reflective surface, the first semi-reflective surface being curved and having a first radius of curvature around a first centre of curvature on the optical axis. The second optical element has a second semi-reflective surface. The first radius of curvature is between 1 and 10,000 times the distance between the first semi reflective surface and the focal point along the optical axis. The first and second semi-reflective surfaces are arranged to form a resonator. The first lens and the first and second semi-reflective surfaces are arranged along the optical axis such that light is transmittable along an optical path through the lens and the resonator. The optical filter further comprises one or more expansion elements located outside of the optical path, and arranged such that expansion of the expansion elements causes relative movement of the first and second semi-reflective surfaces.

According to a second aspect, there is provided a system comprising an optical input and an optical filter according to the first aspect. The optical input is configured to produce a beam containing at least one component of target wavelength $\lambda$, and to direct the beam to the lens along the optical axis. The or each radius of curvature is equal to $z+z_r^2/z$, where z is the distance between the respective semi-reflective surface and the focal point, and $z_r$ is the Raleigh distance of the beam at the focal point, the Raleigh distance being pi times the beam width w at the focal point squared divided by the target wavelength of the filter, $z_r=\pi w^2/\lambda$.

DETAILED DESCRIPTION

Figure 1:
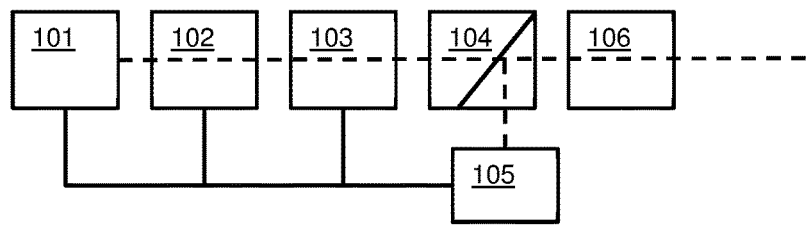
FIG. 1 is a schematic illustration of an optical system.

In order to overcome the problem of higher order modes interfering with monitoring of an optical system, or to allow filtering of modes in other applications, an improved filter is proposed to replace the filter 103 of FIG. 1. In order to explain the operation of the improved filter, some of the underlying physics must first be described.

Beam Waists

Figure 2:
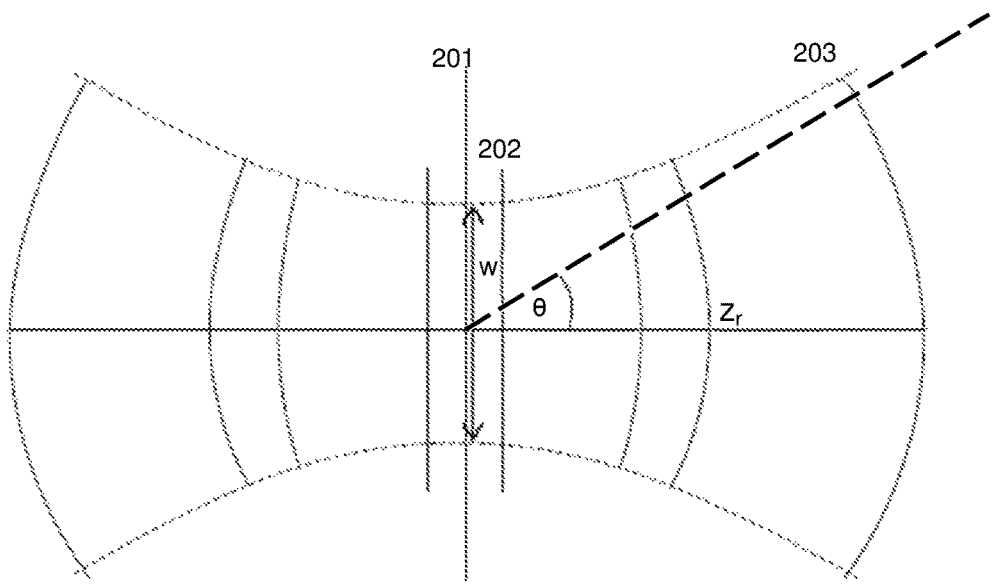
FIG. 2 is a diagram of a beam waist.

FIG. 2 shows a beam passing through a waist 201 (i.e. a point of minimum beam width, such at the focal point when the beam is passed through a lens). The width of the beam at the waist is w, and the beam profile is defined by a hyperbolic function. The radius of curvature of the wavefronts is given by $R(z)=z+z_r^2/z$, where z is the distance from the waist along the optical axis, and $z_r$ is the Raleigh distance, $z_r=\pi w^2/\lambda$. Close to the waist (the "near-field region", 202), $z<z_r$, so the radius of curvature approaches infinity, and the beam propagates as a plane wave with wavefronts substantially parallel to the waist. Far from the waist (the "far-field region", 203), $z>z_r$, so the radius of curvature approaches z, and the wavefronts are substantially spherical shells centred on the midpoint of the waist. The divergence of the beam in the far-field region asymptotically approaches an angle θ.

Beam waist widths given in this specification are $1/e^2$ widths, i.e. the width at which the intensity of the beam drops to $1/e^2$ of the maximum intensity of the beam.

Fabry-Perot Etalon

Figure 3:
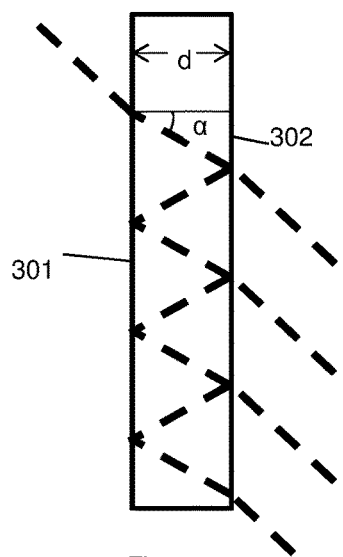
FIG. 3 is a schematic illustration of a Fabry-Perot etalon.

FIG. 3 shows an illustration of a Fabry-Perot etalon, as is commonly used as a frequency filter for optical systems. The etalon consists of two planar, parallel semi-reflective mirrors 301, 302 which face each other. An input beam is reflected between the mirrors, and each of the reflections of the input beam will interfere with other reflections of the beam. The result is that beams with a wavelength such that the phase difference of the beam at the first mirror 301 and the beam at the second mirror 302 is π or 0 will be transmitted (where m is an integer) as this means that each reflection of the beam will have a phase difference of 0 to the other reflections at the second mirror 402 and so the reflections will reinforce each other. Beams with phase differences close to π or 0 will be transmitted with a reduced intensity, and the transmission of beams with other phase differences will be very low. For a distance d between the mirrors and a beam at angle $\alpha$ to the normal direction of the mirrors, the strongest transmission will occur for light for which $2d\cos(\alpha)=m\lambda$, where m is an integer. The free spectral range of an etalon increases as the distance d decreases.

Resonators

Figure 4:
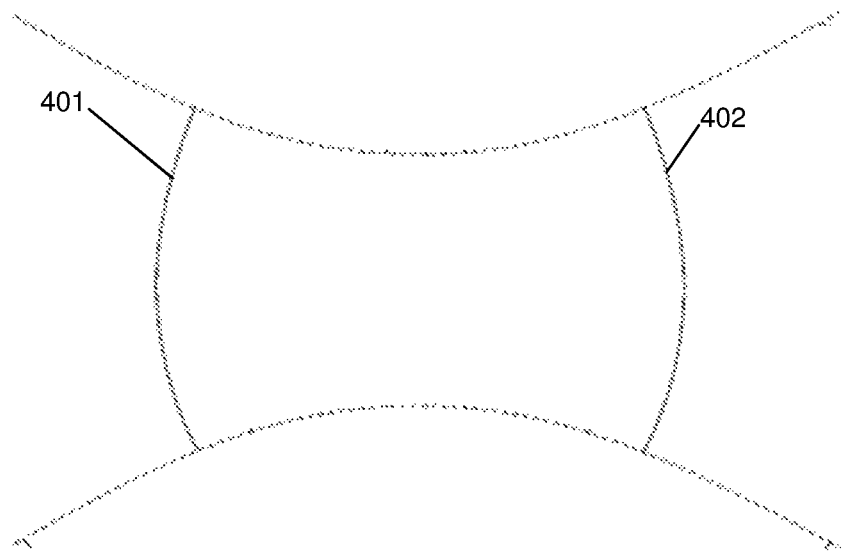
FIG. 4 is a schematic illustration of a resonator.

For a beam which passes through a waist, a resonator can be used instead of a Fabry-Perot etalon. As shown in FIG. 4, the resonator has mirrors 401, 402, each of which is on a wavefront of the beam and curved to match that wavefront. The operation of the resonator is analogous to the operation of the etalon, in that only beams with a phase difference of $\pm\pi$ between the mirrors will be transmitted. However, the relationship between d (the distance travelled between the mirrors by the beam) and the transmission wavelengths is not as simple as for the etalon, and will depend on the beam profile. This is due to phase shifts which occur when passing through a waist, in particular Gouy phase shifts for Gaussian beams.

Gouy Phase Shifts

When a Gaussian beam, or a beam in a higher order Hermite-Gaussian mode, passes through a waist, there will be an additional phase shift compared to what would be expected for the distance travelled. This additional phase shift between two points $z_1$ and $z_2$ (with the waist at z=0) is given by $$\varphi_g(z_2) - \varphi_g(z_2), \text{ where } \varphi_g(z) = (N+1)\arctan\left(\frac{z}{z_r}\right).$$

N is the combined order of the Hermite-Gaussian mode (i.e. for a mode [n,m], N=n+m, for a Gaussian beam [0,0], N=0). For a Gaussian beam passing from the far field (i.e. at $|z|>>z_r$) to the waist and to the far field on the other side, the total phase shift is $-\pi$.

The result is that the transmission wavelength of a resonator where the mirrors are located outside of the extreme near-field or extreme far-field regions, the transmission wavelength of the resonator will depend not only on the distance d between the mirrors, but also on the Hermite-Gaussian mode of the input beam. For the extreme near field region, there is negligible Gouy phase shift, and for the extreme far field region, the Gouy phase shift is a multiple of pi, and so each Hermite-Gaussian mode has the same transmission wavelength. The limits of "extreme near field" and "extreme far field" will depend on the finesse of the resonator (i.e. how sharp the transmission peaks are).

By using a resonator in place of the Fabry-Perot etalon commonly used as a filter, the filter can select not only the wavelength of light, but also the Hermite-Gaussian mode. This avoids the problems noted in the background with Hermite-Gaussian modes interfering with the monitoring of the optical system, and could also be used in other applications to select a specific Hermite-Gaussian mode.

Figure 5:
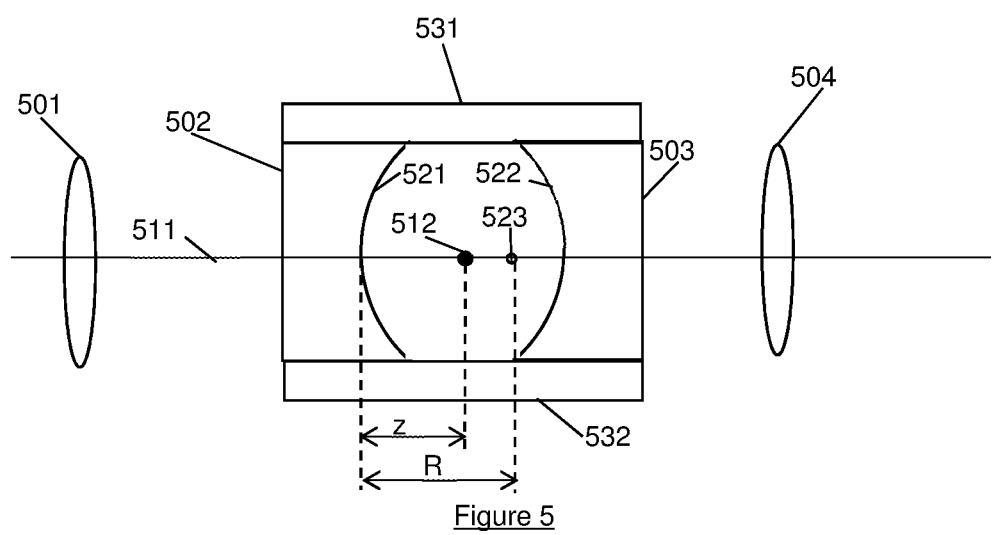
FIG. 5 is a schematic illustration of an exemplary optical filter.

FIG. 5 shows an exemplary optical filter. The optical filter comprises a first lens 501, which has an optical axis 511 and focusses an incoming beam to a focal point 512. The optical filter further comprises first and second optical elements 502, 503 having respective first and second semi-reflective surfaces 521, 522, with the semi-reflective surfaces facing each other. The semi-reflective surfaces are each curved towards the focal point with a respective radius of curvature R, where $R=z+z_r^2/z$, z being the distance between the respective semi-reflective surface 521, 522 and the focal point 512 along the optical axis 511 (the centre of curvature 523, z and R are shown for the first semi-reflective surface 521). The optical filter comprises a second lens 504 configured to collimate the beam emerging from the second semi-reflective surface.

The first and second optical elements 502, 503 are connected via expansion elements 531, 532. The expansion elements are located outside of the optical path of the beam, and configured to cause relative movement of the first and second semi-reflective surfaces 521, 522 by expanding or contracting. This may be used to change the transmission wavelength of the resonator, e.g. to select a different wavelength or mode. While this will cause the semi-reflective surfaces to shift from the ideal positions, the small movements required to adjust the filter are not likely to have a significantly detrimental effect on the output. For example, a typical range of motion would be half a wavelength of the target wavelength of the filter, which for a filter operating in the C band is approximately 0.75 microns. The range of motion (and hence the "error" in z compared to the ideal semi-reflective surface position) may be less than 2 microns, less than 1 micron, less than a target wavelength of the filter, or less than half a target wavelength of the filter. The expansion elements may be piezoelectric elements (with the expansion being controlled by applying an electrical current), or they may be elements with a coefficient of thermal expansion different to that of the optical elements (with the expansion being controlled by temperature, e.g. applied via a heater).

Although not shown in FIG. 5, each of the first and second lenses 501, 504 may be any of a simple lens, a compound lens, or a complex lens, and each may be integrated (or partially integrated) with the respective first or second optical element 502, 503.

The free spectral range of the filter is determined by the distance d between the semi-reflective surfaces along the optical axis, $FSR=\lambda^2/(2dn)$, where n is the refractive index of the medium between the mirrors (~1 in air). The smaller the distance d, the greater the free spectral range. For a filter operating in the C-band ($\lambda$ between 1530 nm and 1565 nm), with a required free spectral range greater than the width of the band (40 nm), the distance d must be less than about 30 microns—but for applications with lower FSR requirements or operating at higher wavelengths, d may be larger.

Alternate means of adjusting the position of the semi-reflective surfaces 521, 522 may be used, or where adjustment of the target wavelength of the filter is not required, the filter may be provided without expansion elements 531, 532.

Figure 6:
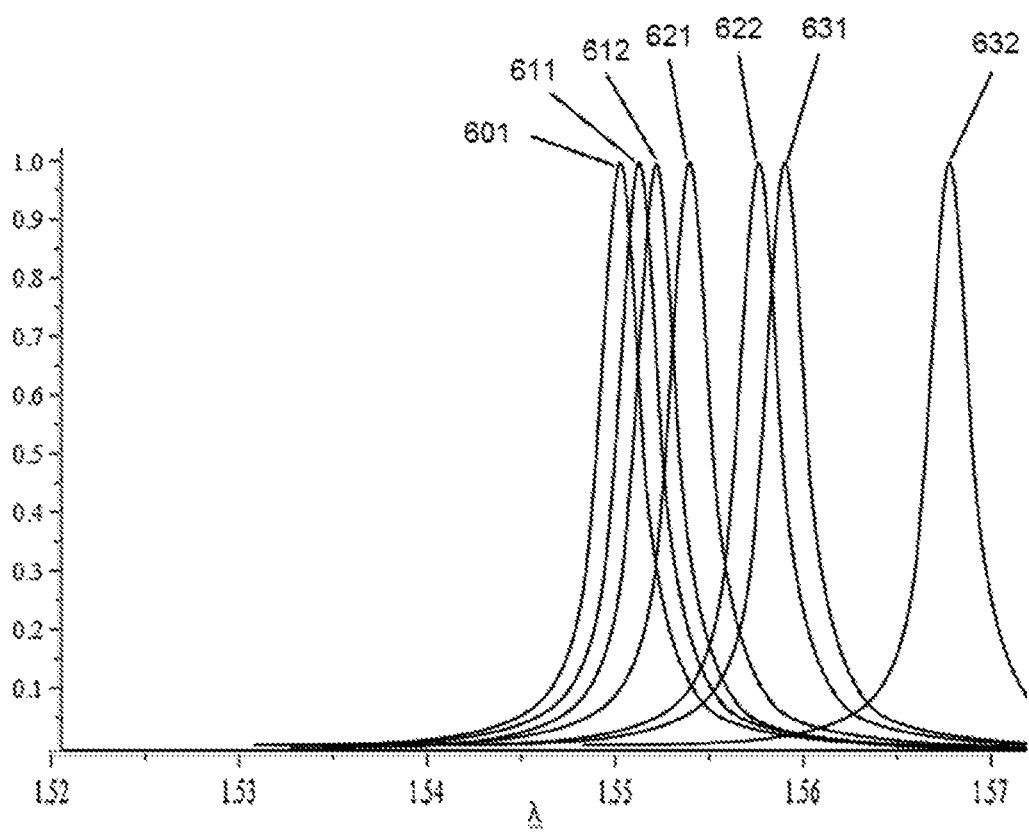
FIG. 6 is a graph of transmission against wavelength for a selection of beams.

FIG. 6 shows a graph of the 0-order (i.e. Gaussian, [0,0]) mode transmission and first-order (i.e. [1,0] or [0,1]) mode transmission for different beam waist widths for resonators with a nominal peak at 1.55 microns (not taking into account gouy phase shift) and an FSR of 40 nm, with other measurements (e.g. the radius of curvature) adjusted accordingly. The first peak 601 is for a plane cavity, i.e. an etalon, and is exactly on the nominal peak for both the 0-order and first order mode. The second set of peaks 611, 612 are for a beam width of 10 microns. As can be seen, the 0-order peak 611 is displaced from the plane cavity peak 601, and the first-order peak 612 is displaced an equal amount from the 0-order peak 611. At this beam width, there is still significant overlap between the peaks for different modes—so the transmission of the first order mode would still be significant when the filter is tuned for the zero-order mode (though it may be acceptable in some applications). However, at lower beam waist widths, the peaks of each mode are further displaced from each other, and so the transmission of other modes when the filter is tuned to a selected mode is much less. This can be seen from the peaks for a 5 micron waist (0-order 621, and first order 622) and for a 10 micron waist (0-order 631, first order 632).

Figure 7:
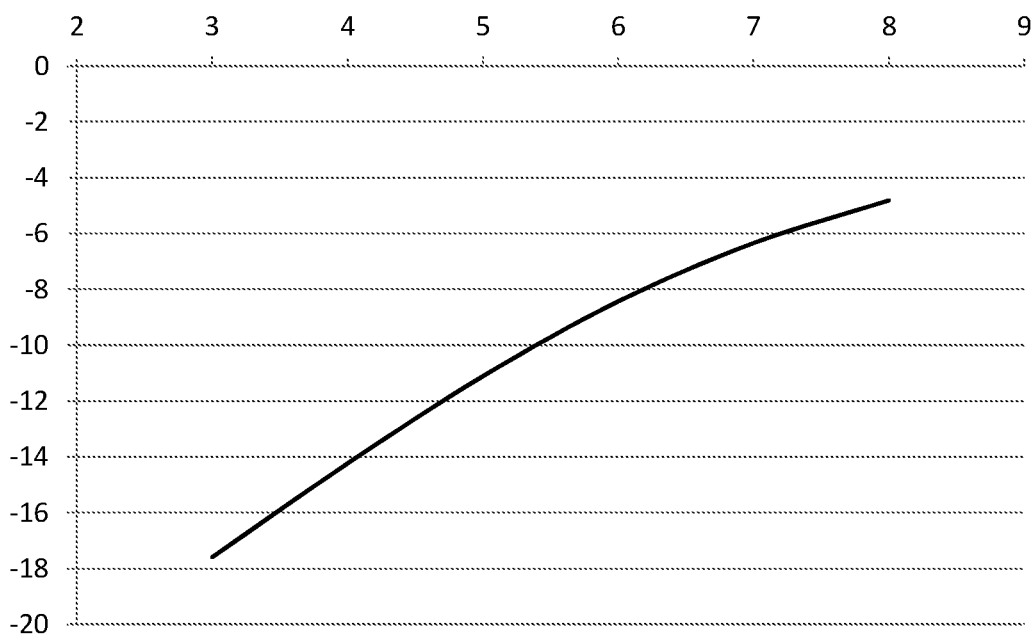
FIG. 7 is a graph of transmission against beam width for an exemplary optical filter.

FIG. 7 is a graph showing the attenuation in decibels of the first order peak in a filter tuned to the 0-order peak for beam waist widths between 3 microns and 8 microns, for filters with an FSR of 40 nm operating in the C-band ($\lambda \sim 1.5$ microns), with other dimensions adjusted accordingly.

Figure 8:
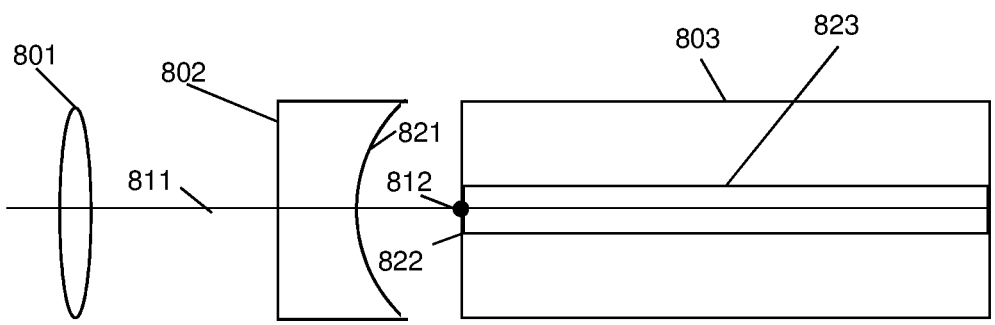
FIG. 8 is a schematic illustration of a further exemplary optical filter.

FIG. 8 shows a second exemplary optical filter. The optical filter comprises a first lens 801, which has an optical axis 811 focusses an incoming beam to a focal point 812. The optical filter further comprises first and second optical elements 802, 803 having respective first and second semi-reflective surfaces 821, 822, with the semi-reflective surfaces facing each other. The first semi-reflective surface is curved towards the focal point with a radius of curvature R, where $R=z+z_r^2/z$, z being the distance between the first semi-reflective surface 821 and the focal point 812 along the optical axis 811. The second semi-reflective surface is a planar surface at the focal point and perpendicular to the optical axis. This is equivalent to the case in the optical filter of FIG. 5 where z=0 for the second semi-reflective surface. The second optical element 803 is a fibre-optic cable. The core 823 of the fibre-optic cable intersects the optical axis 811 at the semi-reflective surface 822, and is at least as wide as the waist of the beam—i.e. the beam which is transmitted through the semi-reflective surface 822 will be transmitted directly into the core 823.

The filter of FIG. 8 may be made with expansion elements in an analogous way to that of FIG. 5.

Figure 9A:
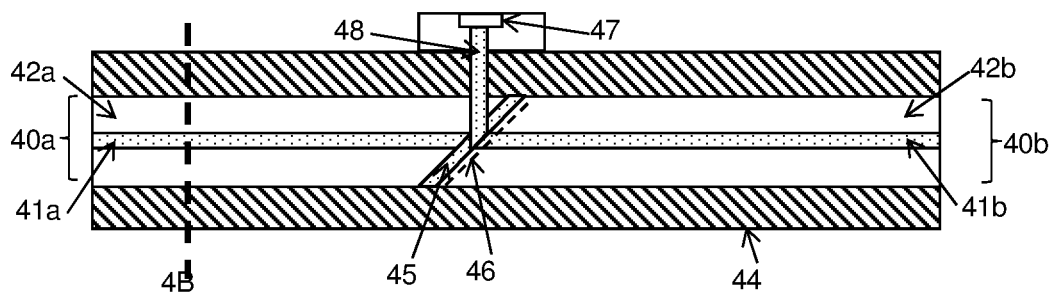
FIGS. 9A and 9B are cross sections of an exemplary optical fibre construction.
Figure 9B:
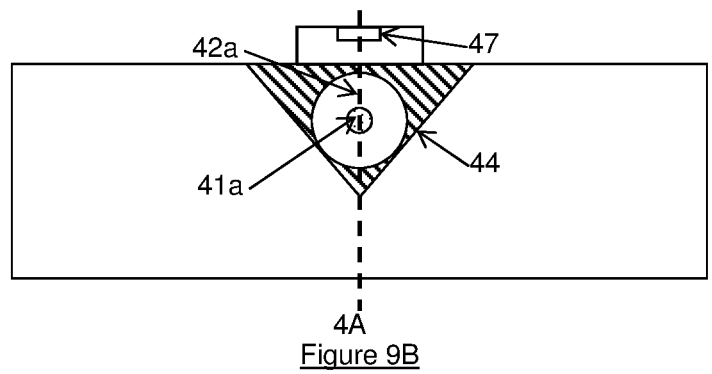

In order to route a signal from the core 823 to a detector (for output monitoring), a fibre tap may be used. Alternatively, a beam splitter may be provided within the fibre. An exemplary fibre construction for achieving this is shown in FIG. 9A (side cross section) and 9B (front cross section). A fibre 40a, 40b comprises a core 41a, 41b and a cladding 42a, 42b. The fibre 40a,b is located in a v-groove 43 (or other alignment means) and held in place using resin 44. The fibre is split into two sections, 40a and 40b, which each have an angled, polished face. The fibre sections are located such that the angled, polished faces are at substantially the same angle and in proximity to each other. The angled polished faces may have an angle of between 40 and 50 degrees, more particularly 45 degrees. A layer 45 of material with a refractive index similar to the core and the cladding, or index matches to the core, is used to connect the angled, polished faces, which will mitigate any minor variations in angle and position. The angled, polished face of the second section 40b is provided with a reflective coating 46, which is configured to reflect a proportion of the light passing through the fibre, e.g. less than 10%, 5%, less than 5%, and/or at least 2%. An alternative method is to use a thermal process to cause a change in the core refractive index which will induce some of the optical power to be re-directed out of the fibre towards a detector.

The reflected light travels to a detector 47 (or other output) through a region 47. The region 47 may comprise material that is index matched to the cladding 41a, 41b. The detector 47 can be placed sufficiently close to the fibre that no lens is required to focus the light onto the detector. The angled, polished faces may be as close as desired to the semi-reflective surface 822.

The resin 44 may be index matched to the cladding 42a,b and/or contain absorbers to reduce cladding modes (unwanted modes resulting from light entering the cladding at the semi-reflective surface). Provided that any absorber is placed beyond the evanescent field of the core (e.g. at least 10 microns), it will not affect the fundamental mode in the core. The absorber may be placed beyond the outer surface of the cladding, with a further material, index matched to the cladding, located between the absorber and cladding. Alternatively the absorber itself may be a material which is index matched to the cladding.

As stated above, the radius of curvature is $z+z_r^2/z$. This may be defined without reference to the beam properties as a radius of curvature at least equal to z. For a resonator with a finesse sufficient to resolve a phase shift $\varphi$, the radius of curvature of one of the mirrors must be less than $z(\csc^2(\varphi))$, where $\csc^2(\ )$ is the squared cosecant, in order to distinguish between modes. Using the small angle approximation, $\csc^2(\varphi)=1/\varphi^2$, so $z<R<z/\varphi^2$. Typical values for the minimum resolvable phase shift are 0.1 radians (giving R<100 z), 0.05 radians (giving R<400) 0.01 radians (giving R<$10^4$z), etc. In order to provide a high finesse, the semi-reflective surfaces should have a high reflectance, e.g. 0.8 or above, 0.9 or above, 0.99 or above, or other suitable values. Typical values for R in practice may be R=z, R<4 z, or R<10 z. The case where z=zr corresponds to R=2 z, and values of R both above and below this may be used.

The invention claimed is:

1. An optical filter comprising:
    a first lens, having an optical axis, configured to focus beams propagating parallel to the optical axis at a focal point;
    a first optical element having a first semi-reflective surface that is curved and has a first radius of curvature around a first center of curvature on the optical axis;
    a second optical element having a second semi-reflective surface that is curved and has a second radius of curvature, equal to the first radius of curvature, around a second center of curvature on the optical axis, wherein:
        the first radius of curvature is between 1 and 10,000 times a distance between the first semi-reflective surface and the focal point along the optical axis,
        the first semi-reflective surface and the second semi-reflective surface are arranged to form a resonator, and
        the first lens, the first semi-reflective surface, and the second semi-reflective surface are arranged along the optical axis such that light is transmittable along an optical path through the first lens and the resonator; and
    one or more expansion elements located outside the optical path and arranged such that expansion of the one or more expansion elements causes relative movement of the first semi-reflective surface and the second semi-reflective surface.

2. The optical filter according to claim 1, wherein
the second radius of curvature is at least equal to a distance between the second semi-reflective surface and the focal point along the optical axis.

3. The optical filter according to claim 1, further comprising:
a second lens arranged along the optical axis and configured to collimate light emerging from the resonator.

4. The optical filter according to claim 1, wherein the first radius of curvature is twice the distance from the first semi-reflective surface to the focal point along the optical axis.

5. The optical filter according to claim 1, wherein each expansion element, of the one or more expansion elements, includes piezoelectric material.

6. The optical filter according to claim 1, wherein each expansion element, of the one or more expansion elements, includes a material having a coefficient of linear expansion different to a material of the first optical element and a material of the second optical element.

7. A system comprising:
an optical input and an optical filter, wherein the optical filter comprises:
a first lens, having an optical axis, configured to focus beams propagating parallel to the optical axis at a focal point;
a first optical element having a first semi-reflective surface that is curved and has a first radius of curvature around a first center of curvature on the optical axis;
a second optical element having a second semi-reflective surface, wherein:
the first radius of curvature is between 1 and 10,000 times a distance between the first semi-reflective surface and the focal point along the optical axis,
the first semi-reflective surface and the second semi-reflective surface are arranged to form a resonator, and
the first lens, the first semi-reflective surface, and the second semi-reflective surface are arranged along the optical axis such that light is transmittable along an optical path through the first lens and the resonator; and
one or more expansion elements located outside the optical path and arranged such that expansion of the one or more expansion elements causes relative movement of the first semi-reflective surface and the second semi-reflective surface;
wherein the optical input is configured to produce a beam containing at least one component of a target wavelength $\lambda$ and direct the beam to the first lens along the optical axis, and
wherein the first radius of curvature is equal to $Z+Zr^2/Z$, where $Z$ is a distance between the first semi-reflective surface and the focal point, and $Zr$ is a Raleigh distance of the beam at the focal point, the Raleigh distance being $\pi$ times a beam width at the focal point $W$ squared, divided by a target wavelength of the optical filter ($Zr=\pi W^2/\lambda$).

8. The system according to claim 7, wherein
the second semi-reflective surface is curved and has a second radius of curvature around a second center of curvature on the optical axis, and
the second radius of curvature is at least equal to a distance between the second semi-reflective surface and the focal point along the optical axis.

9. The system according to claim 7, further comprising:
a second lens arranged along the optical axis and configured to collimate light emerging from the resonator.

10. The system according to claim 7, wherein the second semi-reflective surface is planar and perpendicular to the optical axis.

11. The system according to claim 10, wherein the second semi-reflective surface is located a distance from the focal point less than 1/10 the distance between the first semi-reflective surface and the focal point.

12. The system according to claim 10, wherein the second semi-reflective surface is located within 1 micron of the focal point.

13. The system according to claim 10, wherein the second semi-reflective surface is located at the focal point.

14. The system according to claim 10, wherein
the second optical element is an optical fiber having a core,
the second semi-reflective surface is perpendicular to a core of the optical fiber, and
the optical axis intercepting the core at the second semi-reflective surface.

15. The system according to claim 7, wherein each expansion element, of the one or more expansion elements, includes piezoelectric material.

16. The system according claim 7, wherein each expansion element, of the one or more expansion elements, includes a material having a coefficient of linear expansion different to a material of the first optical element and a material of the second optical element.

17. An optical filter comprising:
a first lens, having an optical axis, configured to focus beams propagating parallel to the optical axis at a focal point;
a first optical element having a first semi-reflective surface that is curved and has a first radius of curvature around a first center of curvature on the optical axis;
a second optical element having a second semi-reflective surface, wherein:
the first radius of curvature is twice a distance between the first semi-reflective surface and the focal point along the optical axis,
the first semi-reflective surface and the second semi-reflective surface are arranged to form a resonator, and
the first lens, the first semi-reflective surface, and the second semi-reflective surface are arranged along the optical axis such that light is transmittable along an optical path through the first lens and the resonator; and
one or more expansion elements located outside the optical path and arranged such that expansion of the one or more expansion elements causes relative movement of the first semi-reflective surface and the second semi-reflective surface.

18. The optical filter according to claim 17, wherein each expansion element, of the one or more expansion elements, includes piezoelectric material.

19. The optical filter according to claim 17, wherein each expansion element, of the one or more expansion elements, includes a material having a coefficient of linear expansion different to a material of the first optical element and a material of the second optical element.

20. The optical filter according to claim 17, wherein the one or more expansion elements include two expansion elements.

* * * * *